Jan. 11, 1927.  1,613,900
W. C. NABORS
WINCH ATTACHMENT FOR AUTOMOBILE REAR AXLES
Filed Jan. 6, 1926
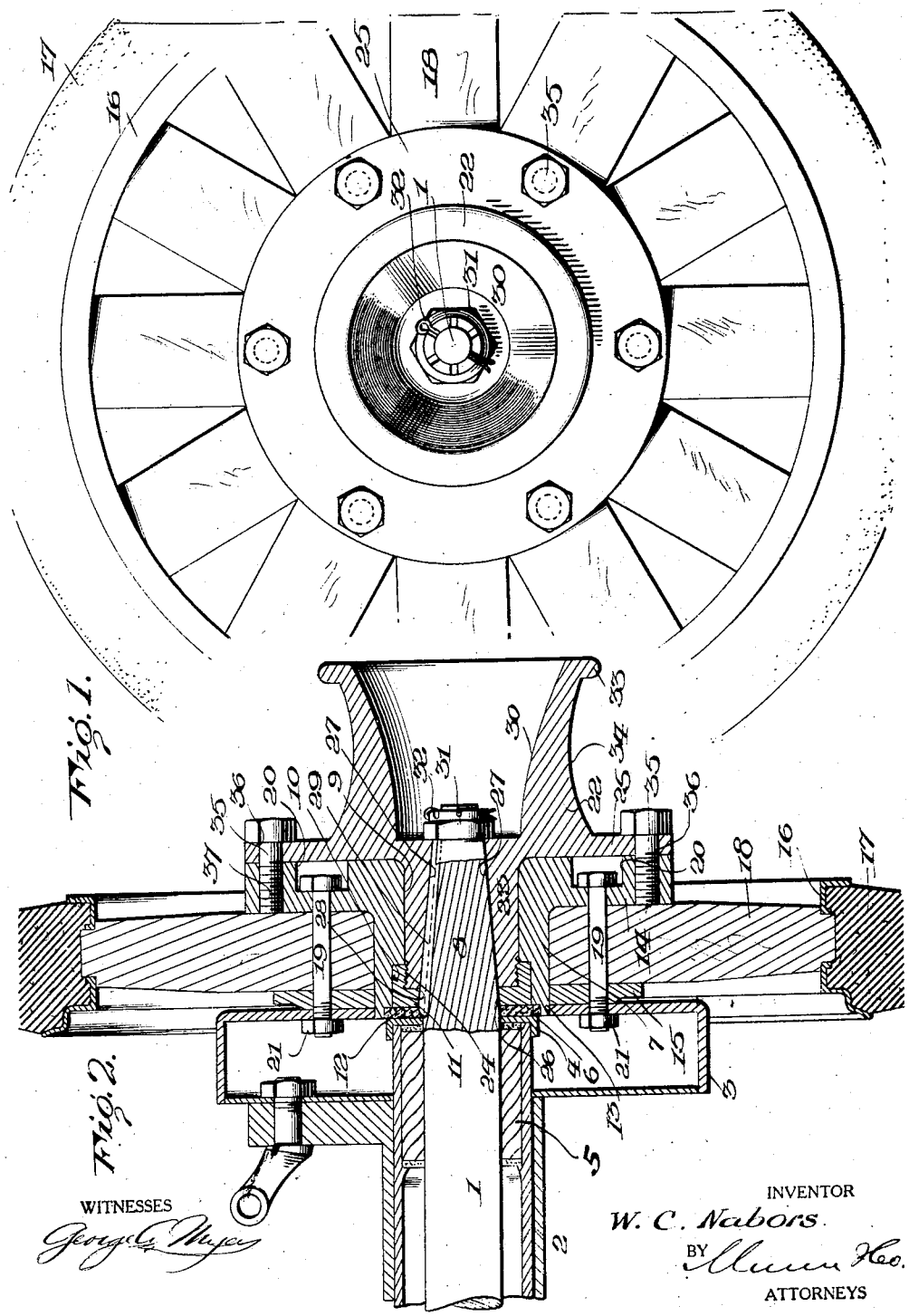
WITNESSES
INVENTOR
W. C. Nabors
BY
ATTORNEYS Patented Jan. 11, 1927.

1,613,900

UNITED STATES PATENT OFFICE.

WILLIAM C. NABORS, OF MANSFIELD, LOUISIANA.

WINCH ATTACHMENT FOR AUTOMOBILE REAR AXLES.

Application filed January 6, 1926. Serial No. 79,693.

My invention relates to improvements in winch attachments for automobile rear axles, and it consists in the combinations, constructions and arrangements herein described and claimed.

An object of the invention is the provision of a simple, reliable and efficient winch attachment for the rear or driving axle of an automobile, the attachment being adapted to be removably secured on a conventional rear axle and affording facilities for deriving power from the associated rear axle without causing rotation of the associated wheel of the axle, whereby the device can be used to perform the functions of a winch without there being any necessity of jacking up the associated wheel.

A further object of the invention is the provision of a device of the character described which takes up but relatively little space on the associated axle and does not interfere in any way with the normal functional movements of the automobile with which it is associated.

Other objects and advantages of the invention will be apparent from the following description, considered in conjunction with the accompanying drawings, in which—

Figure 1 is a fragmentary face view of a winch attachment embodying the invention applied to a rear axle shaft, and Figure 2 is a longitudinal vertical section through the structure exhibited in Figure 1, showing also certain of the conventional parts of a rear axle assembly.

In the drawings, the numeral 1 designates a rear axle shaft which is shown in Figure 2 in association with the rear axle housing 2, a brake drum 3, an axle housing cap 4, roller bearings 5, a hub felt washer 6, and certain other associated parts of a conventional Ford truck rear axle assembly.

In carrying out the invention, I make use of a special hub 7 which has an inner diameter considerably larger than the outer diameter of any portion of the tapering end portion 8 of the axle shaft. The bore of the hub 7 preferably is uniform in diameter from its outer end for the greater part of its length, as indicated at 9, then is enlarged at 10 to receive a bearing cap 11, and is further enlarged at its inner end at 12 to receive the hub felt washer 6. The inner end portion of the hub 7 fits snugly in the central opening 13 in the outer side wall of the brake drum 3 between the outer peripheral wall of the hub felt washer 6 and the inner wall of the opening 13, as is usual.

The hub 7 has an integral outwardly extending flange 14 at its outer end and also carries a separate flange or ring 15 at its inner end. A wheel rim 16, on which a tire 17 may be mounted, is supported in spaced concentric relation to the hub 7 by means of spokes 18, the inner end portions of the spokes 18 being clamped between the flanges 14 and 15 and the inner end portions of certain of the spokes being connected with the flanges 14 and 15 by the bolts 19 which connect the flanges 14 and 15 with each other and also with the adjacent side wall of the brake drum 3, the heads of the bolts 19 being received in cavities 20 in the outer face of the flange 14 and the shanks of the bolts 19 extending into the brake drum and being engaged by the nuts 21.

A winch head 22 has an integral reduced axial extension 23 at its inner end fitting rotatably in the portion 9 of the bore of the hub 7 and having external screw threads on the extreme end portion thereof for engaging with internal screw threads on the cap 11, as at 24. The extension 23 of the winch head and the cap 11 thus together constitute a journal for the hub 7 and the hub 7 and the winch head will be held against relative axial movements when the extension 23 of the winch head is screwed into the cap 11 until an integral outwardly extending flange 25 on the winch head at the outer end of the extension 23 is close to or in actual contact with the outer face of the hub flange 14.

The head of the bearing cap 11 has a central opening 26 which tapers according to the taper of the inner wall 27 of the extension 23 and the tapering inner walls of the opening 26 in the cap 11 and the bore of the extension 23 of the winch head are adapted to fit snugly on the tapering portion 8 of the axle shaft. When the cap 11 and the extension 23 of the winch head are threadedly engaged with each other so that the cap 11 will be disposed in the enlarged portion 10 of the bore of the hub 7 and the flange 25 will be held close to the flange 14, a longitudinally extending key-way 27 in the extension 23 will be in alignment with a key-way 28 in the wall of the opening 26 in the head of the cap 11. These aligned key-ways 27 and 28 are adapted to engage with the usual spline 29 on the tapering portion 8 of the axle shaft so that the extension 23 of the winch head and the cap 11 and therefore the winch head 22 will rotate with the axle shaft 1. The winch head 22 has an axial bore 30 of relatively great area in cross section and this bore is enlarged toward the outer end of the winch head to permit the convenient manipulation of a nut 31 when the latter is screwed to and from position on the outer end portion of the axle shaft 1. When the nut 31 is in operative position on the end portion of the axle shaft 1, it may be retained in operative position in any suitable known manner, as by means of the cotter pin 32 and at this time, the head of the bearing cap 11 will be forced against the hub felt washer 6 and the nut 31 will bear against the shoulder at the juncture of the bore of the winch head with the bore 27 of the extension 23 of the winch head and thus will tend to relieve the brake drum and the bolts 19 of strain incident to the maintenance of the hub 7 in the position shown in Figure 2.

The winch head 22 has an external bead 33 at its outer end which cooperates with the flange 25 to define a peripheral channel on the winch head for the reception of convolutions of a cable (not shown) or like flexible transmission element such as is usually associated with a winch head. The bottom wall of this channel, which is indicated at 34, preferably curves concavely longitudinally of the winch head.

From the foregoing description of the various parts of the device, the operation thereof may be readily understood. The winch head will turn with the axle 1 and therefore can be used to impart motion to an associated cable, not shown, for any desirable purpose. At this time, the wheel which is mounted on the extension 23 and the cap 11 in the manner hereinbefore described may remain stationary. However, when the winch is not in use as a winch and it is desired to transmit motion from the axle 1 to this wheel, cap bolts 35 are projected through openings 36 in the flange 25 and are engaged with aligned openings 37 in the hub flange 14, thus securing the winch to the hub of the wheel so that the wheel and the parts which are connected with the wheel will rotate with the axle 1.

While I have shown and described a winch embodying the invention as applied to a rear axle shaft and certain associated parts of a Ford truck rear axle assembly, it is obvious that the winch also can be applied to rear or driving axles of automotive vehicles of other known types of construction without any change in the construction of the winch or with but such slight structural changes as are obvious. Also, the invention is susceptible of embodiment in forms other than that which is illustrated in the accompanying drawings, without departing from the spirit and scope of the invention, and I therefore consider as my own all such modifications and adaptations of the form of the device which is illustrated in the accompanying drawings, as fairly fall within the scope of the appended claims.

I claim:—

1. The combination with a driving axle, of a winch head having an axial extension at one end mounted on said axle to rotate with the axle, a wheel having a hub rotatably supported directly on said extension of the winch head, and means for connecting said winch head with said wheel, when desired.

2. The combination with a driving axle, of a winch head having an axial extension at one end secured to said axle so that said winch head will rotate with the axle, a hub loosely mounted on the extension of the winch head, said winch head and said hub having juxtaposed flanges formed with openings adapted to be arranged in alignment with each other, and a removable fastening element adapted to be engaged with the walls of the aligned openings in said flanges for transmitting rotary motion from said winch head to said hub, when desired.

3. The combination with a driving axle, of a winch head having an axial extension at one end, a cap removably secured on the extremity of said axial extension in the winch head, the head of said cap and said axial extension of the winch head having aligned axial openings for the reception of an end portion of said driving axle, means securing said extension of the winch head and said cap to the axle to rotate with the latter, a hub having its bore formed for the reception of said axial extension of the winch head and the cap thereon, the portion of the bore of the hub which receives said cap being of greater diameter than the portion of the bore of the hub which receives the axial extension of the winch head, the hub being rotatable on said axial extension of the winch head and said cap, and removable means for securing said winch head and said hub together for rotation as a unit with said axle, when desired.

4. The combination with a driving axle, of a winch head having an axial extension at one end, a cap removably secured on the extremity of said axial extension in the winch head, the head of said cap and said axial extension of the winch head having aligned axial openings for the reception of an end portion of said driving axle, means securing said extension of the winch head and said cap to the axle to rotate with the latter, a hub having its bore formed for the reception of said axial extension of the winch head and the cap thereon, the portion of the bore of the hub which receives said cap being of greater diameter than the portion of the bore of the hub which receives the axial extension of the winch head, the hub being rotatable on said axial extension of the winch head and said cap, and removable means for securing said winch head and said hub together for rotation as a unit with said axle, when desired, said winch head having an axial bore enlarged toward its outer end to permit the insertion of a nut for engaging the adjacent end portion of the axle.

5. The combination with a driving axle, of a winch head having an axial extension at one end formed with a bore for the reception of an end portion of said axle, means securing said axial extension of the winch head and said axle together to rotate as a unit, a wheel loosely mounted on said axial extension of the winch head, removable means for securing said winch head to said wheel when desired, said winch head having a peripheral channel, the bottom of which curves concavely longitudinally of the winch head.

6. The combination with a driving axle, of a winch head having an axial extension at one end, a cap adjustably engaged with the extreme end portion of said axial extension of the winch head, the head of said cap and said axial extension having aligned axial openings for the reception of an end portion of said axle, a hub rotatably supported on said axial extension of the winch head and said cap, said hub having the portion of the bore thereof which receives said cap of greater diameter than the diameter of the portion of the bore of the hub which receives the axial extension of the winch head, said winch head having a flange at the outer end of the hub and said hub having a flange at its outer end in contact with the flange of the winch head, said flanges having openings adapted to be arranged in alignment with each other when the hub has been turned to a certain position about the axial line of the winch head, and a bolt adapted to be projected through the opening in the flange of the winch head and threadedly engaged with the aligned opening in the flange of the hub to secure the winch head and the hub together, when desired.

WILLIAM C. NABORS.